United States Patent Office 2,871,913
Patented Feb. 3, 1959

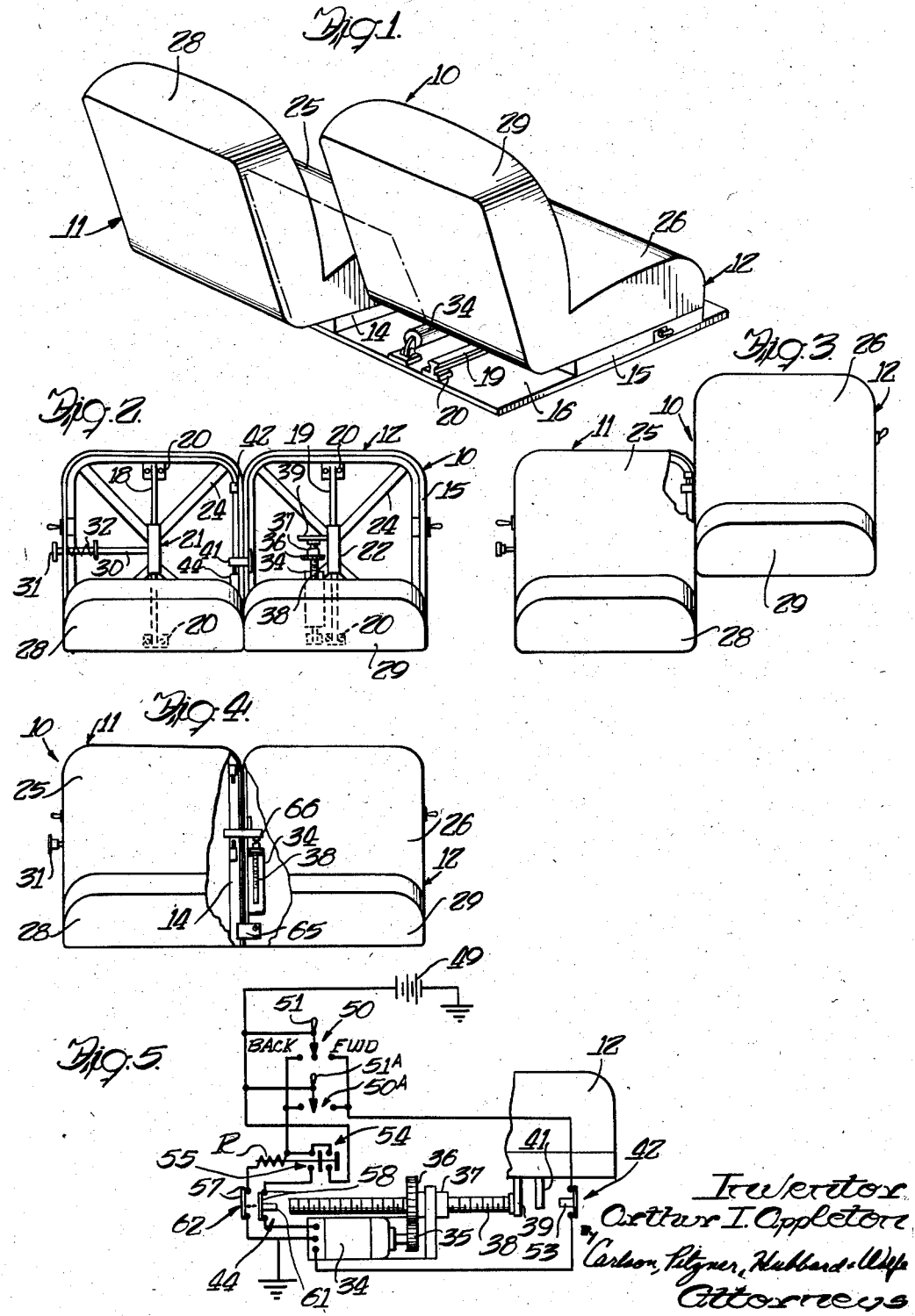

2,871,913
CONTROL FOR AUTOMOBILE SEAT
Arthur I. Appleton, Northbrook, Ill.
Application July 10, 1957, Serial No. 670,895
3 Claims. (Cl. 155—15)

The present invention pertains generally to the field of automobile seats and more particularly to a novel control for electrical power actuated seats of the type operated by suitable switches. The invention is particularly but not exclusively useful on automobiles of the two door type having both front and rear seats.

The general purpose of the invention is to provide an automobile seat having a section susceptible of being temporarily displaced in a fore and aft direction to afford greater access to the space behind the seat. The present invention represents an improvement over the invention disclosed and claimed in U. S. Patent No. 2,660,223, issued November 24, 1953. This application is a continuation-in-part of my copending application Serial No. 285,385, filed May 1, 1952, now Patent No. 2,805,702.

More specifically it is an object of the present invention to provide an improved automobile seat having a means for adjusting the seat at the convenience of the driver and including means for allowing one of the seats to be moved relative to the other seat section for the convenience of persons entering and leaving the car.

A further object of the present invention is to provide an automobile seat having a first positionable section and a second power actuated section, the latter being temporarily displaceable in a fore and aft direction relative to the first positionable section to render the space behind the seat more readily accessible.

Still a further object of the present invention is to provide a double section automobile seat of the character set forth wherein both sections are initially positionable and where one section is power actuated, the former serving as a reference for establishing the normal position of the power actuated section upon the return of the latter from a temporarily displaced position.

Still another object of the present invention is to provide an automobile seat of the foregoing type wherein the positions of the seat are susceptible of direct and easy control from either side of the automobile.

Other objects and advantages of the present invention will become apparent as the following description proceeds, taken in connection with the accompanying drawings wherein:

Figure 1 is a diagrammatic perspective view of an illustrative automobile seat embodying the present invention and showing one power actuated section in a forwardly displaced position.

Fig. 2 is a plan view showing the illustrative automobile seat of Fig. 1 with the two seats in aligned position, the seat cushions having been removed to facilitate illustration of the underlying parts.

Fig. 3 is a view similar to Fig. 2 but showing one of the seat sections in a temporarily displaced position.

Fig. 4 is a view also similar to Fig. 2 but showing a slight modification of the seat construction wherein one end of the power actuating means is anchored to the first positionable section.

Fig. 5 is a form of electrical control means for use with the seat disclosed herein.

While the invention is susceptible of various modifications and alternative constructions, certain preferred embodiments have been shown in the drawings and will be described below in considerable detail. It should be understood, however, that there is no intention to limit the invention to the specific form disclosed, but on the contrary, the intention is to cover all modifications, alternative constructions, equivalents and uses falling within the spirit and scope of the invention as expressed in the appended claims.

Upon more specific reference to the drawing, it will be noted that the invention is there exemplified in a novel automobile seat 10 which is particularly well adapted for use in an automobile of the two-door type. In this instance, the seat 10 is centrally split and comprises a first section 11, which accommodates the driver of the automobile, and a second section 12, which accommodates at least one passenger. The sections 11, 12 include appropriate base frames 14 and 15, respectively, both being mounted for longitudinal sliding movement relative to a common underlying support such as floor 16 of the automobile body. This arrangement may, for example, include one or more guide rails 18, 19, each extending in a fore-and-aft direction and being rigidly fixed to the floor 16 as by means of mounting cleats 20. Slidably secured upon the rails 18, 19 are a pair of sliding shoes 21, 22, each fastened to a respective one of the base frames 14, 15 as by means of bracing 24. Where only a single guide rail is used under each seat section, as in the illustrated construction, each of the base frames may be provided with a moderate amount of outboard support such as rollers or casters (not shown). The base frames 14, 15 also carry seat cushions 25, 26 and back members 28, 29, respectively.

For the purpose of enabling the driver to locate the seat section 11 in a position suited to his individual requirements, the section 11 is provided with an appropriate adjustable positioning means. Such means may, for example, comprise a latching plunger 30 mounted transversely of the base frame 14 and terminating at its outer end in an actuating knob 31. The opposite end of the plunger 30 projects through the sliding shoe 21 and is adapted to register with selected ones of a series of aligned holes or notches in the guide rail 18, securing the sliding shoe 21 at various predetermined points along the rail 18. A loading spring 32 surrounding the plunger 30 tends to maintain the same in registry with the holes or notches until the plunger is manually disengaged by an outward pull on knob 31. Since the shoe 21 is rigidly fixed to the base frame 14 and comprises an integral portion of the seat section 11, it will be appreciated that positioning of the shoe 21 at selected points along the guide rail 18 also serves to maintain the seat section 11 in corresponding selected positions.

Provision is made for temporarily displacing the passenger seat section 12 in a fore-and-aft direction so that it occupies a position considerably forward of the section 11 and thus affords greater access to the space behind the seat 10. This is accomplished by the use of power-actuated means, connected to the section 12 and adapted to move the same relative to both the section 11 and to the floor 16 (see Figs. 1, 2 and 3). In the present instance, the power-actuated means comprises a reversible electric motor 34 which may readily be anchored either to the floor 16 or to the seat section 11. The motor 34 may, for example, be equipped with a drive pinion 35 which engages a gear 36 fixed to a nut member 37. The member 37 is disposed in threaded engagement with a lead screw 38 having one end free and its opposite end connected to the base frame of the seat section 12 as by means of a depending arm 39. The forward and rearward extremities of the fore-and-aft movement of the seat section 12 are determined by a mechanical stop 41 and a pair of limit switches 42, 44. In this instance, the stop 41 is carried by the base frame 15 of the seat section 12 while the limit switches 42, 44 are fixed to the base frame 14 of the seat section 11. The reversible electric motor 34 may conveniently be energized from the battery 49 of the automobile through either one of a pair of duplicate double throw type control switches 50, 50A on the seat sections 12, 11, respectively. Both switches are preferably spring biased into an open position and are operated by moving a suitable handle 51, 51A respectively. Thus, shifting suitable handle 51 or 51A in one direction closes the respective switch 50, 50A to energize the motor 34 and causes it to rotate in the proper direction to move the lead screw 38, the arm 39, and the seat section 12 in a forward direction, the extreme forward position being defined by means of the forward limit switch 42 which is adapted to de-energize the motor 34 upon contact with the mechanical stop 41.

Assuming that the seat sections 11 and 12 are alined as indicated in Fig. 2, the section 12 may be given a forward displacement by rocking the handle 51 in a counter clockwise direction, as viewed in Fig. 5. This immediately closes a circuit energizing the motor 34 which rotates the gears 35, 36 which in turn rotate the nut member 37 to move the lead screw 38 fixed to the seat section 12. The seat section 12 is thereby moved relative to the section 11 to the desired position at which point the handle 52 is released.

When the handle 51 or 51A is released, it returns to its neutral position so as to open the contacts of the switches 50, 50A. If, however, the handle 51 is maintained in its forward or counter clockwise position, the seat section 12, and lead screw 38, will continue to move forwardly until the stop 41 is accosted by the operator 53 of forward limit switch 42 carried by the seat section 11. Contact between the stop 41 and the member 53 serves to open the contacts of the limit switch 42 and de-energizes the motor 34, precluding further forward movement of the seat section 12. Consequently, the seat section 12 becomes fixed in a position of maximum forward displacement.

In order to displace the seat section 12 rearwardly from a forward position to its normal position of lateral alinement with the seat section 11, it is merely necessary to rock the handle 51 momentarily in a clockwise direction as viewed in Fig. 5. This position of the contacts of the switch 50 energizes the motor 34 for rotation in the opposite direction, and the seat is moved rearwardly.

Momentary closure of the reverse switch by moving the handle 51, 51A in the clockwise direction will energize a control relay R, closing normally open sealing-in contacts 54 and motor switch contacts 55. This will cause the motor 34 to rotate in the opposite direction, moving the lead screw 38, the arm 39 and the seat section 12 rearwardly. The rearward limit of movement, and also the normal position of the seat section 12, are defined by means of a double pole rear limit switch including contacts 57, 58 adapted to open and de-energize the relay R and the motor 34 upon contact between the limit switch 44 and the rearward side of the stop 41. Such rearward movement will continue until the seat section 12 has returned to its normal position wherein it is laterally alined with the companion section 11, and regardless of whether the handle 51 is released from or maintained in its clockwise position.

Upon arrival of the seat section 12 at its normal position corresponding to that of the companion section 11, the stop 41 is accosted by operator 61 of rear limit switch 44 carried by the seat section 11. The operator 61 of the rear limit switch has a direct mechanical connection with a switch 62 in series with the control solenoid relay R. As a result of contact between the stop 41 and the operator 61, the contacts of the switch 62 open and de-energize the control solenoid relay R, thereby de-energizing the motor 34 and precisely locating the seat section 12 at its normal position. Such position could also be defined by a positive mechanical stop.

The arrangement just described permits the seat section 11 to be adjusted manually by the driver but requires the use of the power actuating system associated with the seat section 12 to reorient the latter into a normal position corresponding with each new adjustment in the position of the driver's section 11. Consequently, in some instances it might be found expedient to permit the seat section 12 to be positioned in unison with the seat section 11 when the latter is manually adjusted. Referring to Fig. 4, it will be noted that this objective may readily be achieved by connecting the motor 34 directly between the seat sections 11 and 12. Accordingly, one end of the motor 34 is provided with an anchorage 65 which is rigidly fixed to base frame 14 of the seat section 11. The lead screw 38 of the motor 34 is connected directly to a modified arm 66 fixed to the base frame of the seat section 12 and having a portion overlying the base frame 14 of the seat section 11 to perform the function of the mechanical stop 41. Aside from these changes, the control system and switch arrangement are identical with that just described and the seat section 12 may be displaced and repositioned by the application of power in the manner already set forth above.

With the foregoing construction, adjustable reference points or limits are established for the electrical power actuated seat to determine its forward and backward positions. As described by way of illustrative example above, the reference points are adjusted by positioning a seat section carrying a pair of spaced limit switches engageable by a stop member on the moving seat section to de-energize the reversible electric motor. With this construction, the movable seat returns to its rearmost position when the control switch is shifted to one position, and the movable seat travels to its forward position, as determined by the position of the reference, when the control switch is shifted to its alternative position.

I claim as my invention:

1. An automobile seat mountable for fore-and-aft movement on an underlying support and comprising, in combination, first and second seat sections together defining the seat, means for manually positioning one of said seat sections relative to the support, a reversible electric motor drive means for displacing the other of said seat sections in a fore-and-aft direction relative to said one seat section and to the support, means on said manually adjustable seat section for determining limits of fore-and-aft movement of said other seat section relative thereto and control switches mounted on the seat for governing the action of said reversible electric motor drive means and hence the position of said other seat section relative to said one seat section within the limits defined by said limit determining means.

2. Seat positioning control for use with an automobile seat slidable for longitudinal forward and backward movement on tracks mounted on the floor of an automobile comprising, in combination, a reversible electrical power means for moving the seat forward and backward, a switch having two positions, said switch when in one position energizing said power means to move said seat forward and when in the other position energizing said power means to move said seat backward, means for de-energizing said electrical power means to determine the forward position of said seat, means located independently of said seat for selectively adjusting said de-energizing means, and means operative in response to a rearwardly moving seat for de-energizing said electrical power means to stop said seat in a rearward position.

3. A seat positioning control for use with an automobile seat slidable for longitudinal forward and backward movement on tracks mounted on the floor of an automobile, said seat positioning control comprising, in combination, means engageable by a forwardly moving seat for determining the limit of forward movement of said seat, means located independently of said seat for selectively adjusting the position of said determining means, a switch having two positions, a reversible electric motor operative when said switch is in one position to move said seat forward, said determining means de-energizing said motor to stop said seat in a preselected forward position, said motor being operative when said switch is in its other position to move said seat rearward, and means engageable by said rearwardly moving seat for de-energizing said motor to thereby stop said seat in a rearward position.

References Cited in the file of this patent

UNITED STATES PATENTS

| | | |
|---|---|---|
| 1,751,907 | Cripps | Mar. 25, 1930 |
| 2,446,393 | Russell | Aug. 3, 1948 |
| 2,588,165 | Rossmann | Mar. 4, 1952 |